Patented Feb. 8, 1927.

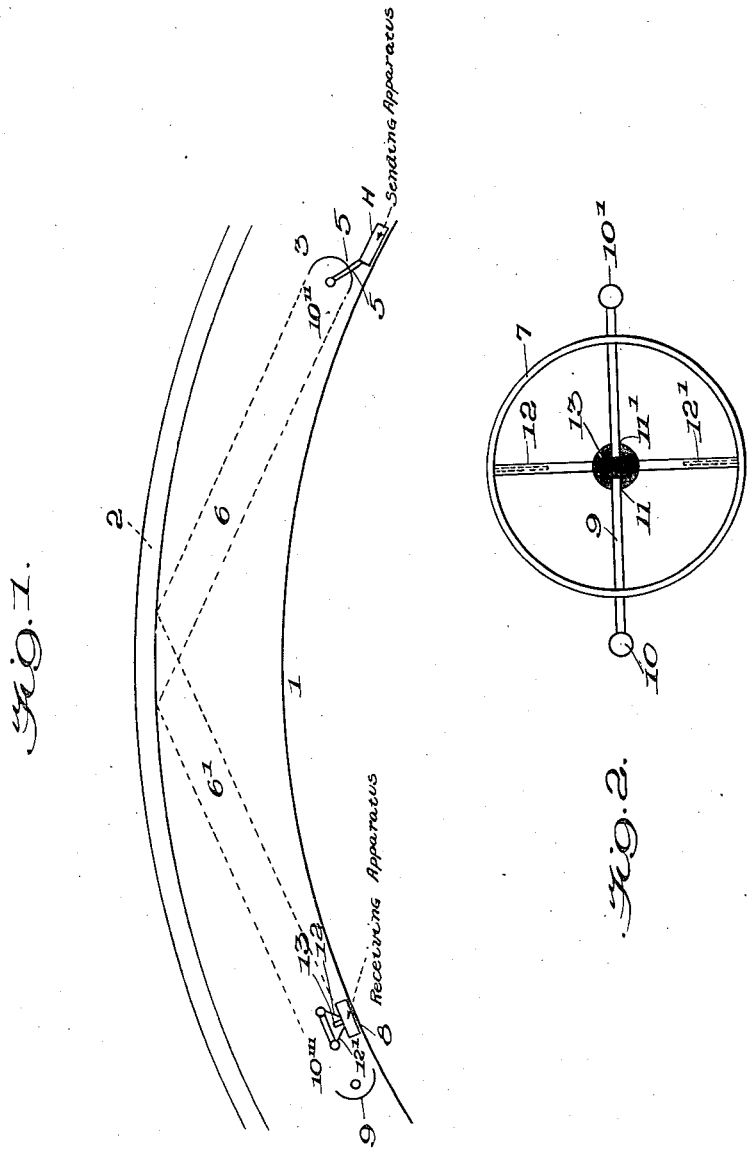

1,617,242

UNITED STATES PATENT OFFICE.

REGINALD A. FESSENDEN, OF CHESTNUT HILL, MASSACHUSETTS.

WIRELESS TRANSMISSION AND RECEPTION.

Application filed October 13, 1924. Serial No. 743,265.

My invention relates to the wireless transmission and reception of energy, and more particularly to wireless signaling; and still more particularly to increased efficiency in transmission and freedom from disturbances in reception and increased selectivity and range; and more especially in wireless telephony and broadcasting.

It has for its object increased efficiency, freedom from disturbances, increased selectivity and range, and convenience in operation and cheapness.

Figures 1 and 2 shew, partly diagrammatically, apparatus adapted for carrying out my invention. Fig. 1 shews how the waves are transmitted and received; and Fig. 2 shews a reception device in more detail.

This invention relates to further developments along the lines of applicant's previous patents, U. S. 956,489—June 21st, 1906; 974,762—Jan. 14th, 1907; 1,015,881—Dec. 19th, 1906; British 2955, 1908; and others.

Heretofore in the practice of the art of wireless signaling it has been the practice to use for transmission and reception waves having their electric component perpendicular, or in a plane perpendicular to the earth's surface. The reason for this is that if the antennæ wires are placed parallel to the earth there will be substantially no radiation in a plane at right angles to the antenna and to the earth's surface; in fact the antenna then acts as a directional antenna in a plane containing the antenna and at right angles to the earth's surface. This is well known and is shewn in applicant's German Patent 225,256—Jan. 14th, 1907; and the methods therein shewn are used extensively and known as the wireless compass.

So far as applicant knows no attempt has been made to use waves having their electrical component parallel to the earth with the exception of British Patent 2955, 1908 referred to above; and this, while operating well for its limited purpose, was very wasteful of power and had but short range. The experience of others has no doubt been similar.

But during the course of some experiments during the late war it occurred to applicant that it would be of interest to see if a beam of waves having its electrical component parallel to the earth's surface would act differently. On trying the experiment it was found that the previous excessive absorption no longer occurred, especially when the reflector was so tilted that the beam of waves was slightly inclined away from the earth's surface, as shewn in Fig. 1; where the electrical component is perpendicular to the plane of the paper. In fact the transmission was found to be much better than with the usual way, in which the electrical component is parallel to the plane of the paper, in Fig. 1.

It was found that it was not necessary that the beam should be inclined away from the earth's surface, as if the reflector was slowly tilted nodes of alternate large range and small range were found to occur, especially if a sheet of copper were laid on the ground beneath and in front of the reflector.

It was also found that the effect was somewhat better, on many occasions considerably so, if continuous waves were used. It was also found that the effect of atmospheric and other disturbances was reduced very greatly, and at times entirely. It was also found that the beam of waves so emitted was not absorbed to the same extent by the Heavyside layer, (for explanation of evidence of the existence of this layer see Electrical Review, London, May 11th and 18th, 1906; Trans. Amer. Inst. Elec. Eng. July, 1908; Electrician, London, Dec. 19th, 1919; Popular Radio, November, 1923) the turning of the plane of polarization through a right angle from that hitherto used appearing to greatly diminish the absorption and reflection losses and scattering. And the fact that other stations operated with the plane of polarization perpendicular to the earth, greatly diminished their disturbing effect on the receiving station of the present system, which is arranged to receive waves transmitted with the plane of polarization, i. e. the plane of the electrical component of the waves, substantially parallel to the earth's surface, or approximately so. There were also other advantages.

In Fig. 1, 1 is the surface of the earth, 10'' a short antenna end-on, which may be of the type shewn in applicant's projector patents referred to above, or of other form, as well known in the art, or of the type shewn at 10, 10', Fig. 2. The source of oscillations is shewn at 4, and 5, 5' are the leads thereto from the antenna.

The reflector 3, may be either of the parabolic spherical or cylindrical forms, according to the lateral dispersion desired and range. It may be made of a sheet of copper or other conductor, or of parallel wires, as well known in the art. The wave-length and size of antenna, which lies horizontally to the earth's surface, will preferably be small compared with the dimensions of the reflector when it is desired to send a concentrated beam. By the term "small wave length" is meant wave length small compared with that standard in the art, or, in other words, substantially as disclosed in applicant's companion application, Serial No. 532,489, filed Jan. 28, 1922, where the wave length is disclosed as above one meter and below fifty meters. This application is a continuation-in-part of said application, Serial No. 532,489.

Means for generating waves of short wave length are well known in the art, e. g. as shewn in applicant's patents referred to above, and in applicant's application Ser. No. 532,489, applicant's Patents 793,777; 923,963; et al; applicant's papers in Nature and elsewhere; and have been used successfully by himself and by others. See Electrician, London, May 19th, 1922, for production of 3 meter waves with applicant's compressed gap transmitter and Austin's paper in Bureau of Standards technical publications, May, 1907, on one of applicant's compressed gas gaps loaned the Bureau for purposes of tests. Also the DeForest three electrode hot cathode tube, as is well known in the art. Also the hot cathode oscillator tube of applicant, shewn in applicant's specification, Ser. No. 423,185, filed Nov. 10th, 1920. This, which is a development of applicant's former types, shewn in U. S. application 222,301, Aug. 26th, 1904, and U. S. Patents 915,280 and 1,133,435, is peculiarly adapted to the production of short wave lengths, for with very short wave lengths the extremely high frequency currents flowing in the hot cathode are confined much more to the surface than with the usual frequencies, and hence the efficiency is much increased as much less cathode has to be heated, i. e. much less of the mass of the cathode or much less conductor, and the response is better. Moreover, by making nodes in the cathode conductor and placing the anode in suitable position opposite one of the nodes, or more than one, the antenna itself which radiates the waves may be constituted of a short section of a heated wire or hollow cylinder which also acts as cathode. Or it may be an extension of such wire or operatively connected thereto. In this way very short waves may be efficiently produced, and also efficiently radiated. This last described method and apparatus is not claimed in the present application.

The reflector is preferably tilted slightly away from the plane of the earth's surface, as shewn, though, as stated above, it may be tilted down to be parallel to it, especially if a sheet of conducting material is placed in front of it or beneath it, as described above.

If the distance is short, there will be no reflection from the Heavyside layer as the waves will not reach that high. With long transmission the waves it is believed, see experiments referred to above, are reflected as shewn.

At the receiving end a small horizontal antenna, as shewn at 10, 10', Fig. 2, may be used. Or, as shewn in Fig. 1, a loop antenna, suitably tuned and with capacity, as is well known in the art, described for example in applicant's German Patent 225,-256; Jan. 14th, 1907; and elsewhere. This is shewn more in detail in Fig. 2. The loop is supported in any suitable way, normally in a horizontal plane, by the leads 12, 12' of stiff wire, attached to the insulating support 13, so that the loop 7 may be rotated and tilted in any desired way. The receiving apparatus 8 may be of any of the well known types, such as are used or are suitable for receiving the waves of the type used, i. e. wireless waves, of short length, preferably.

In place of the loop 7 a receiving reflector, preferably similar to 3, may be used; the receiving antenna may be similar to 10, 10' of Fig. 2, and the leads 11, 11' attached to a receiving apparatus like 8.

The loop 7 used as receiving apparatus as shewn in Fig. 1, has the advantage for some purposes that it will receive from all directions in the earth's horizontal plane and at the same time not be responsive to disturbances coming from overhead. It may also be used to cut out any particular set of disturbing influences by conjoining with it the short horizontal antenna 10, 10' as shown in Fig. 2; which is preferably formed of a pair of knobs 10, 10' and a pair of rods, 9, 9'. When used for antenna in conjunction with a reflector, as shewn at 3, 10'', Fig. 1, the knobs may be omitted, as they slightly increase the size of the reflector necessary for equal definition of beam.

This method of horizontal plane polarization has many advantages as described above. It is especially valuable in broadcasting, as powerful stations near by may use, the one horizontal, and the other vertical, polarization, and listeners-in near by may use the oppositely polarized receiving sets. I. e. a receiver using a vertically polarized antenna apparatus of the usual type will not be substantially interfered with by a high powered horizontally polarized sending station. It also enables those using loop reception to listen in simultaneously to all directions while still enjoying freedom from static, and hence is especially suitable for marine work and inter-subscriber communication and the like. And at the same time, by the use of the method shewn in applicant's Patents, e. g. 727,329, Mar. 14th, 1903; 752,895, Mar. 14th, 1903; et al. may operate directionally.

Where the horizontal loop or coil antenna, as i. e. of the type described, and shewn at 7, Figs. 1 and 2, is used for emitting waves as in broadcasting, the coil or loop is preferably placed on the top of a high pole and at a distance from absorbing bodies which might act as above described, prejudicially, in the case of the projector described above.

What I claim is:—

1. In wireless signaling, the method of increasing the reliability of operation and diminishing errors and disturbance, which comprises transmitting the wireless signals by horizontally polarized waves projected from the sending station at an angle substantially inclined to the plane of the earth's surface at said sending station.

2. In wireless signaling, the method of increasing the reliability of operations and eliminating errors and disturbance, which comprises receiving horizontally polarized waves at the receiving station at an angle substantially inclined to the plane of the earth's surface at said receiving station.

3. In wireless signaling, the method of increasing the reliability of operation and diminishing errors and disturbance, which comprises transmitting the wireless signals by horizontally polarized waves projected from the sending station at an angle substantially inclined to the plane of the earth's surface at said sending station and receiving said horizontally polarized waves at the receiving station at an angle substantially inclined to the plane of the earth's surface at said receiving station.

REGINALD A. FESSENDEN.